June 6, 1967 F. J. WINCHELL 3,323,818
ADJUSTABLE LENGTH MECHANISM
Filed Nov. 25, 1964

INVENTOR
FRANK J. WINCHELL
BY Edward H. Goodrich
HIS ATTORNEY 3,323,818
ADJUSTABLE LENGTH MECHANISM
Frank J. Winchell, Franklin Village, Mich., assignor to General Motors Corporation, Detroit, Mich., a corporation of Delaware
Filed Nov. 25, 1964, Ser. No. 413,775
7 Claims. (Cl. 287—58)

This invention relates to an adjustable length mechanism and particularly to an infinitely adjustable telescoping joint which may be quickly and easily detachably locked in any extended position.

A movable canopy which may be adjustably shifted into and out of closed position is one of the many applications which requires an easily operable telescoping joint mechanism that can be detachably locked in adjusted position.

Heretofore, slidably adjustable joints have involved interfitting sleeves which are fastened in adjusted position by bolts, set screws, pins fitted into aligned holes and other arrangements which are slow and difficult to operate and which frequently loosen under vibrating stresses. Furthermore, when these prior slidable joints have been used on vehicles, the loose interfit of the joints and their holding mechanisms have been a frequent cause for objectionable noise due to rattling of parts.

It is, therefore, an object of my invention to provide an improved adjustable length mechanism wherein two slidably interfitting members may be easily and simply locked at a preadjusted length by a manual turning of one member relative to the other member without the use of tools.

A further object is to provide an improved telescoping joint which may be easily and detachably locked in any extended position and which will not loosen under compression and tension stresses.

A further object is to provide an improved telescoping joint which may be easily and detachably locked in any extended position, and which will wedge into tighter locking engagement under longitudinal stresses within the joint.

It is a still further object of this invention to provide an improved telescoping joint embodying a wedge-type locking device which may be engaged by relative rotation of the telescoping parts at any extension of said parts.

To these ends and to improve generally upon devices of this character, this invention consists in the various matters hereinafter described and claimed. In its broader aspects, the invention is not necessarily limited to the specific arrangements selected for illustrative purposes in the accompanying drawings wherein FIGURE 1 is an end view of my adjustable length device.

Figure 1:
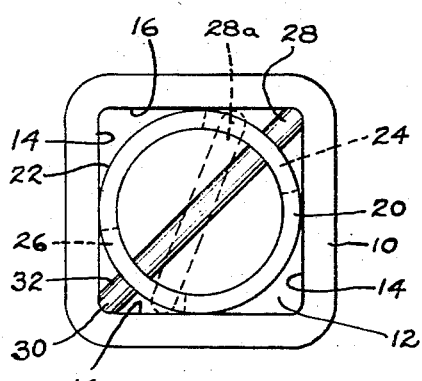

As illustrated, a tubular member 10 has an opening 12 axially extending therethrough and formed by two opposing pairs of substantially parallel interior flat faces 14 and 16 which provide an opening substantially square in cross section. The exterior of the member 10 may be of any suitable configuration, but is herein illustrated as square in cross section. An internal tubular member 20 extends within the opening 12 and has an external cylindrical surface 22 loosely engageable with the opposing internal flat faces 14 and 16 of the tubular member 10 permitting slidable telescoping adjustment of the internal tubular member 20 within the tubular member 10.

The internal tubular member 20 axially projects out of one end of the external tubular member 10. The projecting outer end of this member 20 and the opposite end of the external tubular member 10 are suitably secured to other mechanisms (not shown) which are adjustably held in position by the telescoping members 10 and 20. One of these end connections and preferably that of the tubular member 20 is a pivotal connection so that the members 10 and 20 may be subjected to a relative partial rotation for locking and unlocking the interfitting tubular members 10 and 20 at desired extended positions.

A pair of diametrically opposed arcuate slots 24 and 26 radially extend through the wall of he inner tubular member 20 and longitudinally extend circumferentially of this tubular member in corresponding angular relation to the axis of this tubular member. These slots may be of corresponding lengths and are preferably located near the end of the internal tubular member 20 which lies within the outer member 10. The general planes of these longitudinally extending slots 24 and 26 are preferably parallel to each other and in corresponding angularly disposed relation to a diametrical plane through the internal tubular member and which diametrical plane passes through one of these slots. Although each of these slots is illustrated with generally parallel spaced side walls, my invention also embodies arcuate slots with a longitudinally advancing spiral contour similar to that of the lead of a screw thread.

Figure 2:
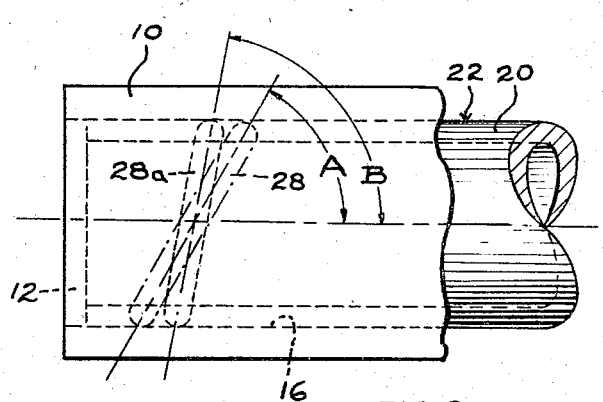
FIGURE 2 is a fragmentary side elevation.
Figure 3:
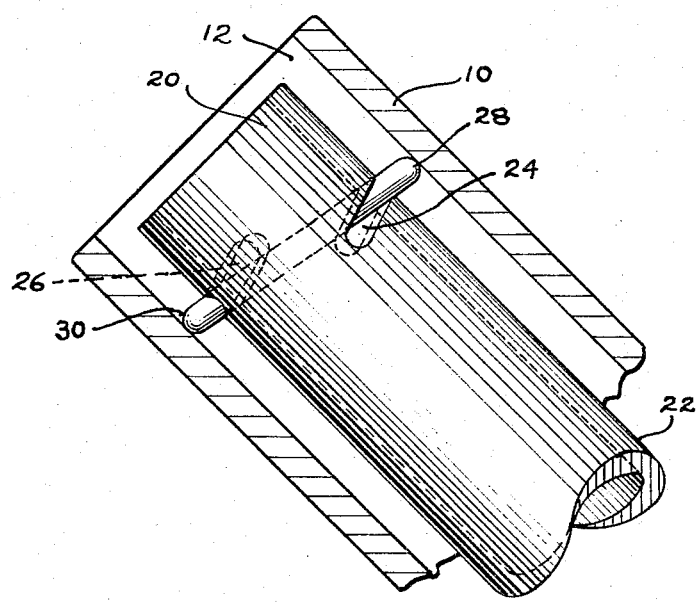
FIGURE 3 is a longitudinal section showing the telescoping joint in unlocked position.

A locking cam, herein shown as a generally cylindrical pin 28, angularly extends transversely through the inner tubular member 20 and is angularly positioned and slidably guided by the opposing side walls of each of the slots 24 and 26. This pin, when in unlocked position, extends through an intermediate portion of each slot and has a length to diagonally extend across the rectangular opening 12 in the outer member 10. The ends of the pin are preferably rounded to a particylindrical form at 30 to loosely slidably engage one or both of the rounded interior corners 32 at the adjacent inner wall faces 14 and 16. Hence, when the pin 28 is in the unlocked position illustrated in FIGURES 1 and 3 and in the dot-dash position of FIGURE 2, it is located intermediate the ends of the slots 24 and 26 and diagonally positioned within the outer member 10. In this unlocked position, the inner and outer members 10 and 20 may freely slide in axial telescoping relation since the exterior face 22 will slidably engage the walls 14 and 16 and the angularly disposed slots 24 and 26 are axially spaced with respect to each other to angularly locate the axis of the pin 28 forwardly tilted with respect to the axis of member 20 at an angle less than 90° as indicated at A.

When it is desired to positively lock the telescoping members 10 and 20 in a preadjusted extended position, the members 10 and 20 are turned relative to each other through a partial rotation. This is usually accomplished by a partial rotation of the tubular member 20 within the outer member 10 and may be effected through a suitable handle (not shown) secured to the outer end of the inner tubular member 20. It will be appreciated, however, that the locking and unlocking operation of the camming pin may be effected by any suitable relative rotation of the tubular members 10 and 20 with respect to each other. During this partial rotation, the angular lead of the longitudinally extending slots 24 and 26 cooperatively tilt the pin 28 with respect to the axis of the tubular member 20 while swinging this pin about this axis to the dot-indicated wedged locking position 28a shown in FIGURES 1 and 2. Hence, this partial relative rotation produces a tiltable orientation of the pin 28 into wedging angular relation with the opposing side faces as 16 of the outer member 10. This tilt of the pin 28 increases from the illustrated angle A to the angle B which is still less than 90° but sufficient to provide the desired wedging operation. Since the pin 28 in its wedged position 28a has its axis located slightly out of plane with a plane passing through the center of the pin and perpendicular to the axis of the outer tubular member 10, it will be appreciated that a longitudinal stress as a compressive axial stress between the members 10 and 20 in locked position, will tend to tilt the pin 28 and wedge it even tighter in locked position. This tightly locked wedging engagement positively holds the joint in rattle-free extended position. A partial reversed rotation of the inner tubular member 20 quickly and easily unlocks the pin 28 for slidable adjustment of the telescoping joint. Although the pin 28 is illustrated as releasably locking against opposing flat surfaces 16, my invention also contemplates making the outer tubular member 10 with an internal cylindrical wall in slidable interfitting relation with the surface 22 of the inner member 20 since the angular lead of the slots 24 and 26 would shift the pin into and out of locking position in the same manner as above-described. Hence, my invention comprises an infinitely adjustable telescoping joint which is free from backlash.

I claim:

1. An adjustable length mechanism comprising a pair of coaxial telescoping inner and outer members in axially slidable and relatively rotatable relation, said inner member having a slot therethrough angularly disposed to its axis and opening onto the outer member, a locking member angularly extending through the inner member and projecting from the slot into engageable relation with said outer member, and the inner member having camming portions within said slot and slidably engaging the locking member, said camming portions tiltably shifting the locking member about the axis of said inner member and about an axis perpendicular to the longitudinal axis of said inner member into and out of locking engagement between said telescoping members in response to relative rotation of said members.

2. An adjustable length locking mechanism comprising a pair of coaxial telescoping inner and outer tubular members in axially slidable and relatively rotatable relation, said inner member having an aperture therethrough, said inner member having a slot diametrically opposed to the aperture and angularly disposed to the common axis of said members, a locking cam transversely extending through the said aperture and said slot into engagement with the inner surface of said outer member, side walls on the angularly disposed slot slidably engaging the locking cam, and said side walls tilting the locking cam about a compound axis in response to the relative rotations of said inner and outer tubular members to shift the locking cam into and out of wedged engagement with the outer tubular member.

3. An adjustable locking joint comprising a pair of slidably telescoping outer and inner tubular members which are relatively rotatable, said inner member having a pair of diametrically opposed slots therethrough, said slots longitudinally extending circumferentially of the inner member in angular relation to a diametrical plane through said inner member, one of said slots being in spaced relation to the other slot axially of said inner member, and a locking pin transversely extending through the inner tubular member and slidably projecting out of said slots into endwise engagement with said outer member, the relative rotation of said inner and outer members acting through the angularly disposed walls of said slots to swing the opposite ends of the locking pin into and out of locking engagement with said outer member.

4. An adjustable locking joint comprising an outer tubular member having a noncircular inner surface, an inner member having an outer surface with portions engageable with said inner surface and other portions spaced substantially from said surface, said inner member being axially slidably and rotatably disposed in said outer member, said inner member having diametrically opposed camming portions in angularly advancing relation circumferentially and axially of the inner member, a locking pin transversely extending through and projecting from the other portions of said inner member in angular relation to the axis of the inner member and slidably engaged by said camming portions, the locking pin having ends respectively engageable with the inner wall of the outer member whereby said camming portions will spirally swing the locking pin to shift said ends into and out of locking engagement with said outer tubular member when said members are rotated with respect to each other.

5. An adjustable locking joint comprising an outer tubular member having a noncircular inner surface, an inner tubular member having a circular outer surface slidably and rotatably disposed within said outer member, the inner member having diametrically opposed slots provided with camming faces generally spirally disposed axially and circumferentially of said inner member, a locking pin disposed in said slots with its ends extending beyond said inner member and transversely extending through said inner member engageable with the inner surface of the outer tubular member, said pin being slidably engageable with the camming faces of the slots, whereby the movement of said spiral camming faces against the pin upon relative rotation of the tubular members will angularly tilt the pin about two axes to swing the pin into and out of wedged locking engagement with said outer tubular member.

6. An adjustable locking joint comprising an outer tubular member having a pair of spaced substantially flat walls in opposing relation, an inner tubular member having an external cylindrical wall slidably journalled within the outer member, the inner member having a pair of diametrically opposed slots provided with opposed substantially parallel camming faces angularly disposed to the axis of the inner tubular member, a locking pin transversely extending through said inner member and projecting endwise from said slots in angular relation to a diametrical plane of the tubular member through the pin, said camming faces slidably engaging the pin to angularly locate the pin, end portions on the pin respectively engageable with flat walls, whereby the camming faces will tiltably shift the ends of the pin into and out of wedged locking engagement with said flat walls in response to relative rotation of the tubular members.

7. An adjustable locking joint comprising an outer tubular member having a longitudinally disposed rectangular opening therethrough formed by pairs of opposing flat walls, an inner cylindrical tubular member slidably telescoped in the outer member for relative rotation between said opposing pairs of flat walls, the inner member having a pair of diametrically opposed slots provided with opposed substantially parallel flat camming faces angularly disposed to the axis of the inner member and angularly disposed to a plane normal to said axis, a locking pin transversely extending through the inner member and slidably engaging said camming faces, said pin axially projecting from said slots with its ends engageable with the outer member whereby rotation of the inner member with respect to the outer member angularly shifts the pin ends into and out of wedged locking engagement with a pair of said opposing flat walls.

References Cited

UNITED STATES PATENTS

| | | | |
|---|---|---|---|
| 1,019,558 | 3/1912 | Thompson | 285—38 |
| 1,447,519 | 3/1923 | Schade | 287—126 X |
| 1,558,334 | 10/1925 | Boss | 285—403 X |
| 2,397,382 | 3/1946 | Smith | 287—126 |
| 2,992,026 | 7/1961 | Farber | 287—58 |

FOREIGN PATENTS

| | | |
|---|---|---|
| 118,968 | 9/1944 | Australia. |
| 586,720 | 3/1947 | Great Britain. |

CARL. W. TOMLIN, *Primary Examiner.*

THOMAS F. CALLAGHAN, *Examiner.*

J. L. KOHNEN, *Assistant Examiner.*